United States Patent [19]

Hodge

[11] 4,093,265
[45] June 6, 1978

[54] FIFTH-WHEEL BRAKING CONTROL

[76] Inventor: John E. Hodge, Box 91, Moline, Ill. 61265

[21] Appl. No.: 762,289

[22] Filed: Jan. 25, 1977

[51] Int. Cl.$^2$ ............................ B60T 7/20; B60T 8/18
[52] U.S. Cl. ............................ 280/438 R; 188/112 R; 188/195
[58] Field of Search .................. 280/432, 433, 438 R; 188/112, 195

[56] References Cited

U.S. PATENT DOCUMENTS

| | | | |
|---|---|---|---|
| 2,662,616 | 12/1953 | De Lateur | 188/112 |
| 3,397,899 | 8/1968 | Thompson | 280/432 |

Primary Examiner—Joseph F. Peters, Jr.
Assistant Examiner—John A. Pekar
Attorney, Agent, or Firm—Glenn H. Antrim

[57] ABSTRACT

A prior fifth-wheel braking control has a pair of links that support a trailer and rotate a small amount to operate brakes of the trailer to prevent overriding. A toggle or indexing action for stability is obtained by raising the fifth wheel and its load slightly to change positions of the links between a pulling condition and an overriding condition. The present improvement comprises adjustable stops positioned with respect to the links to determine the distance of their forward travel and therefore determine the amount of forward traction to be supplied by a tractor for changing position of the links as required for releasing the brakes of the trailer. The stops have different settings for substantially different weights of trailers to limit the amount of traction required to start the trailers.

2 Claims, 5 Drawing Figures

FIFTH-WHEEL BRAKING CONTROL

BACKGROUND OF THE INVENTION

This invention relates to trailer hitches and particularly to improved controlling systems connected to the hitches, or fifth-wheel mountings, for operating automatically the brakes of trailers.

In U.S. Pat. No. 3,397,899 issued to Theodore F. Thompson on Aug. 20, 1968, a fifth-wheeled hitch with an improved controlling system with stabilizing means is described. Two brackets are mounted on opposite sides of a frame at the rear of a tractor to secure a fifth wheel for supporting the front end of a trailer. The fifth wheel is mounted to the pair of brackets through a pair of upright supporting links that permit the fifth wheel to move about ½ inch (1.27 cm) to 1 inch (2.54 cm) fore and aft with respect to the frame of the tractor. A control for the brakes of the trailer that is being pulled is coupled to the upright links and is operated as force applied from the fifth wheel causes the links to move through the short distance.

While a tractor is pulling a trailer, the fifth wheel is in a rearward position to actuate the braking control for maintaining the brakes of the trailer released. Should the momentum of the trailer tend to cause the trailer to overrun the tractor, the fifth wheel is pushed forwardly with respect to the frame of the tractor to apply brakes in sufficient amount to slow the traler and to return the fifth wheel to a rearward position.

To provide stability, an indexing or toggle action for the upright supports is required. When the fifth wheel has moved to either a forward or a rearward position, a substantial change of force in the opposite direction must be required to return the fifth wheel to its former position. In the embodiment described in the patent to which reference has been made above, each of the upright links has a pivot at the bottom and has a stop arrangement that permits the upper portion of the link to move a short distance fore and aft to travel through the position at which the load or downward force is supported directly over the pivot. Through this construction, the front end of the trailer is at its highest point with respect to the frame of the tractor when the fifth wheel is at an intermediate point with respect to the fore-and-aft movement of the fifth wheel and gradually assumes a slightly lower position with respect to the frame as the fifth wheel moves past the intermediate point. The amount of indexing is therefore directly proportional to the load on the trailer.

When a trailer is heavily loaded, this type of hitch has not functioned satisfactorily. When a heavily loaded trailer with its tractor is stopped, the fifth wheel is in a forward position and the brakes of the trailer are applied. Before the trailer can be started forward again, either the brakes must be released by a special manual control or the tractor must provide sufficient traction to raise the load a small amount required to move the fifth wheel in a rearward position. Although the vertical distance through which the trailer is to be moved is very small, the amount of starting traction to be provided by the tractor is undesirably great.

SUMMARY OF THE INVENTION

An adjustable stop is connected to each of a pair of brackets of a fifth-wheel hitch for contacting a respective one of the upstanding links to which the fifth wheel is connected. The setting of the stops determines the distance that the fifth wheel can move forward past the peak where the resistance to the movement starts to decrease and where movement in the reverse direction starts to increase. Each stop may include either a pair of screws or a bar with a single screw to be contacted by each of the pivoted links as it moves forward a predetermined distance past the peak. When a tractor is to support a trailer that is heavier than a trailer to which it was previously connected, the screws are adjusted inwardly to decrease the distance that the fifth wheel can travel forward past the peak. By decreasing this distance of forward travel, the amount of traction that is required for moving the fifth wheel rearwardly sufficiently to release the brakes of the trailer is decreased.

DESCRIPTION OF THE PREFERRED EMBODIMENT

Figure 1:
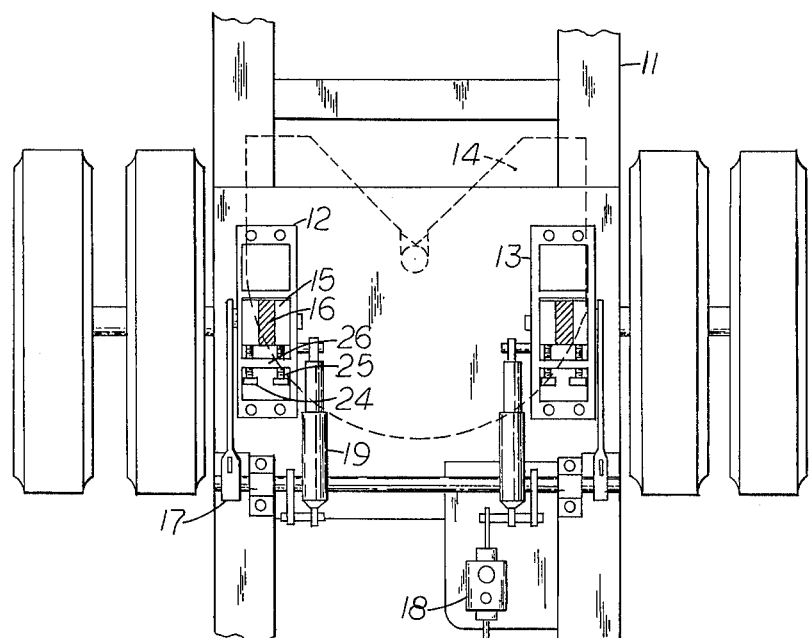
FIG. 1 is a top view of a fifth-wheel hitch assembly shown on a rear portion of a tractor frame.

The rear portion of a frame 11 of a tractor supports laterally spaced brackets 12 and 13 for supporting a conventional fifth wheel 14. As shown for bracket 12, each bracket has an upright link 15 connected to the bracket 12 and an upright supporting member 16 connected to a frame for supporting the fifth wheel 14. The link 15 is connected to the bracket 12 as described below to permit the upper end of the link to move a short distance fore or aft according to a change in the direction of force applied to the link by the fifth wheel 14. At each of the brackets 12 and 13, the link 15 is connected to an arm 17 for actuating a braking control device 18. The arm 17 is connected through an arrangement of linkages and a crank as described in the patent mentioned above to the device 18 that may be a hydraulic cylinder, reservoir, and valve. To prevent movements of short duration from operating the braking control device 18, a pair of cushioning or shock-absorbing devices 19 are connected between the frame 11 and the linkages that connect the lever 17 to the braking control device 18.

Summarizing the operation of the braking control as described in the patent mentioned above, when a tractor is starting to pull a trailer such that a rearwardly directed force is applied to the fifth wheel 14 with respect to the frame 11, the upper portions of a pair of links 15 are moved rearwardly a short distance with respect to the brackets 12 and 13. The movement of the links 15 actuates the braking control device 18 to release the brakes of the trailer that is being pulled. When the tractive force is decreased and the momentum of the trailer causes the trailer to push forwardly on the tractor, the upper portions of the links 15 are moved a short distance forwardly to rotate the pair of arms 17 for operating the braking control device 18. The braking control device 18 is now operated in the required direction for operating the brakes of the trailer that have been connected to the device.

Figure 2:
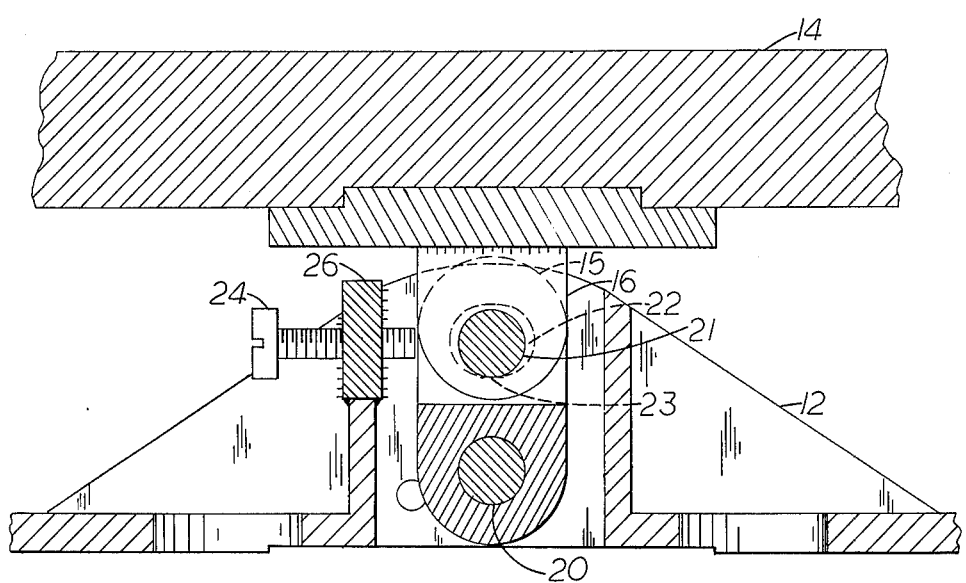
FIG. 2 is a longitudinal, cross-sectional view of one of the brackets of FIG. 1 to show a stop limiting the forward movement of a pivoted support for a fifth wheel.

The arrangement for supporting the link 15 for slight rotation within the bracket 12 is shown in the cross-sectional view of FIG. 2. The link 15 has a lower shaft 20 and an upper shaft 21 separated vertically for connecting the link 15 within the sides of the bracket 12. The lower shaft 20 is secured within the link 15 and rotates within bearings through the sides of the bracket 12. The upper shaft 21 is also secured within the link 15 and extends through the walls of the bracket 12, but is movable fore and aft a short distance within an elongated opening 22 within each wall of the bracket 12. Assuming that the base of the bracket 12 is level, the center of the opening 22 is on a vertical line through the center of the shaft 20, and when the upper shaft 21 is centered within the opening 22, the fifth wheel 14 and therefore the load supported by the fifth wheel is at a highest position with respect to the frame 11 to which the bracket 12 is attached. As shown more clearly in FIG. 3, a central space is provided in the upper portion of the link 15 to receive the upright supporting member 16 to which is attached a frame for supporting the fifth wheel 14.

The shape of the opening 22 is such that the link 15 can be moved easily through a small arc as long as a load is not applied to the link. The bottom portion 23 of the opening 22 has a radial center at the center of the lower shaft 20 and likewise, the upper portion of the opening has the same center. The right side of FIG. 2 is toward the rear of a tractor, and when the fifth wheel 14 is pulled to the right, the upper shaft 21 moves rearwardly until it is stopped by the rear arcuate portion of the opening 22. When the base of the bracket 12 is level, the rearward position of the fifth wheel 14 tends to be stable because the fifth wheel 14 and the load supported by it must be raised slightly above the bracket 12 to follow the arc about the center of the lower shaft 20 as the upper shaft 21 moves forwardly within the bracket 12. Likewise, when the upper shaft 21 is moved forwardly until it is in contact with the front portion of the opening 22, the position of the fifth wheel 14 with respect to the bracket 12 tends to be stable because sufficient force from a tractor will need to be applied forwardly on the bracket 12 with respect to the fifth wheel 14 to raise the wheel slightly before the upper shaft 21 can be returned to the rearward position.

As described above, when a trailer is to be started and the fifth wheel 14 is forward, an excessive amount of power is required if a trailer is heavily loaded to start the tractor forward before the brackets 12 and 13 are moved forwardly with respect to the fifth wheel 14. The rearward movement of the fifth wheel 14 is necessary to operate the braking control 18 of FIG. 1 for releasing the brakes of the trailer. Two adjustment screws 24 and 25 as shown for the bracket 12 has been added to the brackets 12 and 13 for adjusting the forward travel of the upper part of the link 15 and its shaft 21 within the opening 22. As shown in FIG. 2, a heavy crossbar 26 is welded between the sides of the bracket 12 parallel with the upper portion of the link 15. The screws 24 and 25 (FIG. 1) are turned through the block 26 to bear on respective separated upper portions of the link 15. When a load on the fifth wheel 14 is light, the screws 24 and 25 are unnecessary and can be turned outwardly so that the rotation of the link 15 is determined by the ends of the elongated opening 22. For increasingly heavy loads, the screws 24 and 25 for each of the brackets 12 and 13 are turned inwardly with the ends of the screws being kept even on a transverse line so that the ends function as stops to limit the distance through which the upper portion of the links 15 can rotate about their lower shafts 20.

Figure 3:
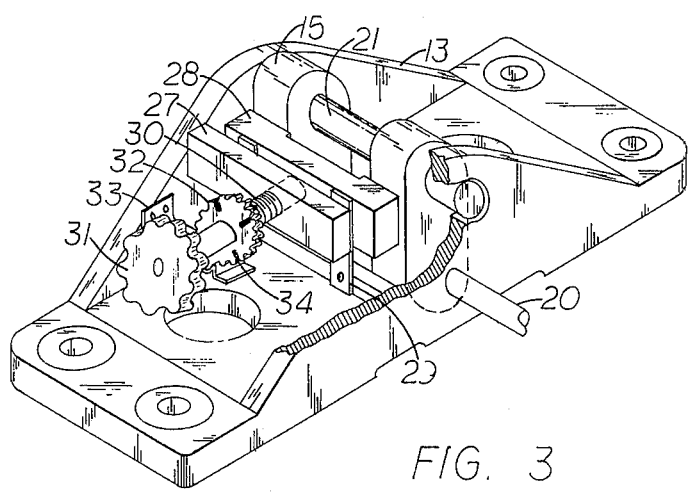
FIG. 3 is a perspective view of a bracket to show a different embodiment of a stop using a single screw and a block.

With reference to FIG. 3, a different embodiment uses a single adjusting screw at each of the brackets 12 and 13 for readily adjusting the amount of forward movement of the link 15. A crossbar 27 having an internally threaded hole for receiving an adjusting screw is like crossbar 26 described above in that it is welded between the sides of one of the brackets 12 and 13 at a distance in front of the upper portion of the link 15. However, the distance between the crossbar 27 and the link 15 will probably need to be greater to accommodate an intermediate stop bar 28, and the crossbar 27 would likely be somewhat thicker to withstand the pressure that would be concentrated at the center of the block when the upper portion of the link 15 moves forwardly. The length of the block 28 is somewhat less than the distance between the sides of the bracket 13, has sufficient thickness to withstand the stopping force, and has a slight recess in the side facing the link 15 to straddle the upright supporting member 16 (FIG. 1). Retaining means having only moderate strength is required to hold the stop bar 28 at the required height within the sides of the bracket 13. The end of an adjustment screw that is to bear against the stop bar 28 might be turned down, and a hole drilled in the center of the block for receiving the turned-down portion. A conventional retaining clip can be used at the end of the screw to retain the bar. Alternately, to prevent drilling and weakening the center of the bar 28 where the greatest strength is required, a pair of straps 29 fabricated from spring material may be connected to the side of the bar 28 opposite the link 15 and extend downwardly to be fastened to the base of the bracket 13. A large adjusting screw 30 is turned inwardly through the center of the crossbar 27 such that its inner end bears against the center of the forward side of the stop bar 28. To provide easy adjustment, a knob 31 is secured to the outer end of the screw 30.

A locking or an indexing device will be required for the screw 30 to prevent its turning after it is adjusted. A locking nut can be provided to lock the screw 30 against the forward side of the crossbar 27, but preferably an indexing means that also indicates the amount of rotating of the screw 30 during adjustment is preferred. An indexing wheel 32 having circumferential notches is shown rigidly fastened to the screw 30 and is spaced far enough from the knobs 31 to permit space for grasping the knob. A flat indexing spring 33 having one end connected to one of the sides of the bracket 13 extends transversely such that one of its faces at the other end is urged against the notched circumference of the indexing wheel 32. The free end of the indexing spring 33 is formed, or a small cross member added to the face, to provide a ridge transversely thereacross for entering the notches of the wheel to provide conventional indexing operation. The indexing spring 33 has sufficient width to contact the wheel over the usual range of adjustment of the screw 30.

During adjustment, the rearward shoulders of the two stop bars 28 should be even on a tranverse line for contacting evenly the upper spaced portions of the links 15 within the brackets 12 and 13. The stop bars 28 function as the levers with arms of equal lengths to divide the stopping force substantially evenly between the two upper portions of an individual one of the links 15. To equalize the spacings between the stop bars 28 and the links 15 for the opposite brackets an indicator may be provided on each of the adjustment screws 30. For example, spaced marks of different colors such as the marks 34 on the outer face of the indexing wheel 32 may be applied either to the indexing wheel 32 or to the knob 31 for determining the turns or fractions of turns of the adjusting screw 30. For additional accuracy after the indicating marks are similarly positioned, the number of notches of the indexing wheel encountered during rotation of the screw 30 can be counted. While the fifth wheel 14 and the pair of links 15 are in their farthest rearward position with respect to the brackets 12 and 13, the knobs 31 at each of the brackets 12 and 13 can be rotated until the stop bars 28 are positioned against their respective links 15. Then by counting the turns of rotation of the knobs 31 and counting the number of times that the indexing spring 33 enters notches of the indexing wheel 32, the adjusting screws 30 can be turned outwardly to provide equal distances that the links 15 will travel forwardly before being stopped by their respective stop bars 28 and adjusting screws 30.

Figure 4:
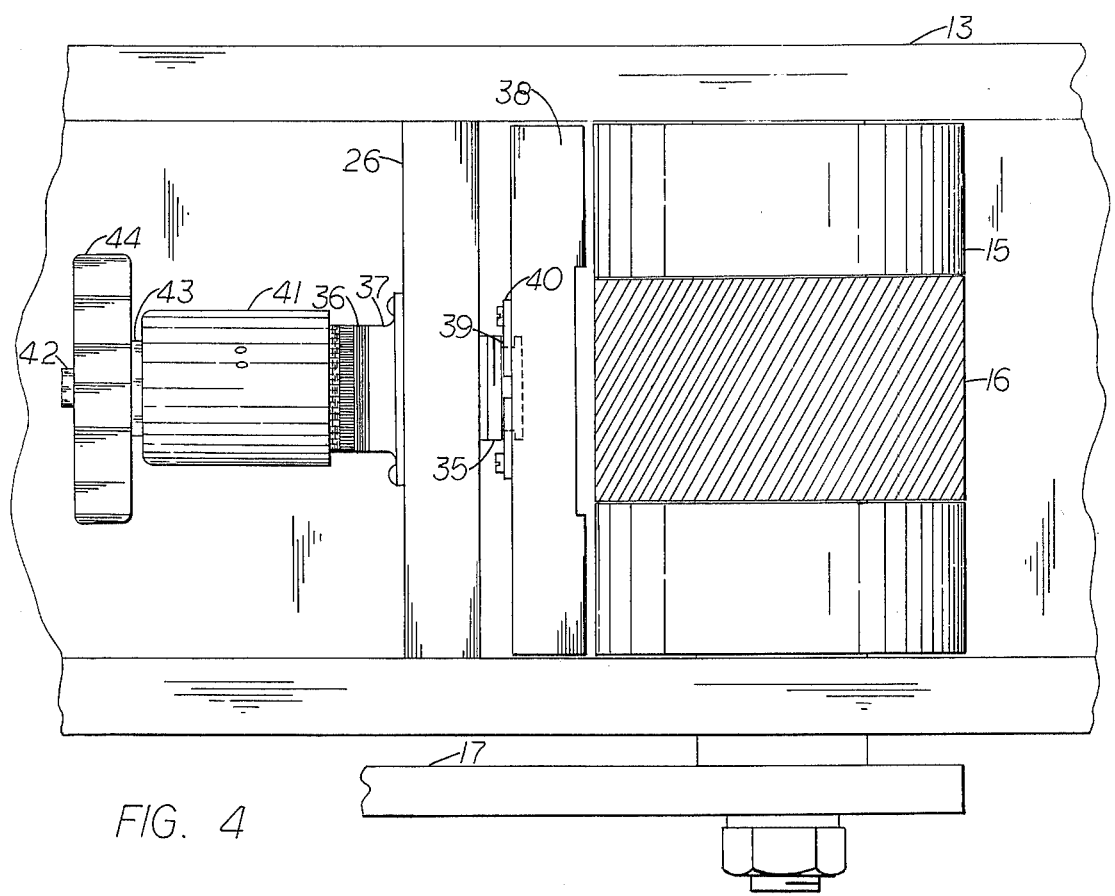
FIG. 4 is a top view of a modified adjuster using a single screw.
Figure 5:
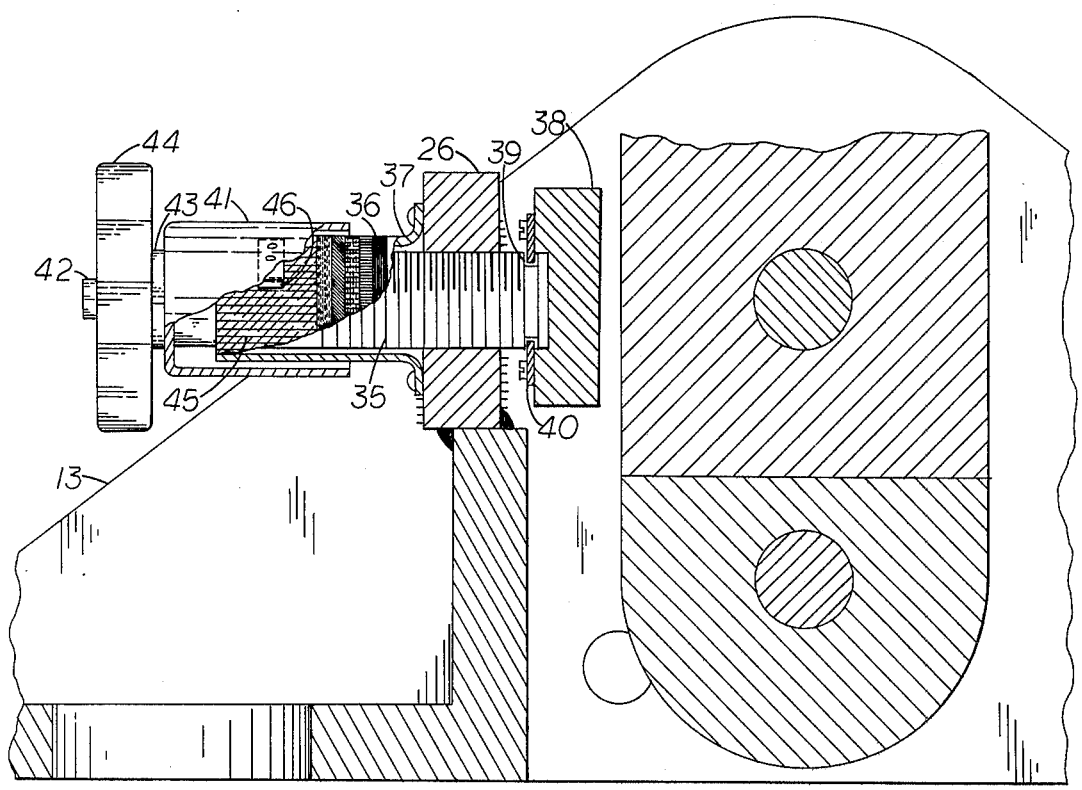
FIG. 5 is a central, longitudinal cross-sectional view of a portion of a bracket and supporting link and a cutaway view of the adjuster of FIG. 4.

Another embodiment showing a single screw adjuster but with indicating means to provide easy direct reading of the setting of the screw is shown in FIGS. 4 and 5. Narrow bands of color 36 on a sleeve 37 about an adjusting screw 35, that corresponds to the adjusting screw 30 of FIG. 3, provides the direct indication. As described previously, the screw 35 is turned through the crossbar 26 to position a stop bar 38 against the upper separated portions of the link 15. To maintain the stop bar 38 at the correct height, the inner end of the adjusting screw 35 is rotatively connected to the forward face of the stop bar 38. A small portion of the inner end of the adjusting screw 35 is turned down so that its diameter is slightly less than the inside diameter of the internal threads of the crossbar 26, and a shallow circular cavity in the center of the forward side of the stop bar 38 receives the turned-down end of the screw 35. A circumferential groove 39 that is about 3/16 inch (0.48 cm) deep and 3/16 inch from the end of the screw is formed to receive inner circular edges of a pair of retaining plates 40 that are fastened to the forward side of the crossbar 26. The indicator to show the distance that the adjusting screw 35 and the stop bar 38 is moved rearwardly is provided by two coaxial cylinders about the screw 35. The inner cylinder is a sleeve 37 on which are placed narrow bands of different colors 36 about that end adjacent the crossbar 26. The sleeve 37 has a flange fastened to the crossbar 26 in a usual manner by screws.

The outer cylinder of the indicator is a thimble 41 that has an inside diameter that is slightly greater than the outside diameter of the sleeve 37. To facilitate fastening the outer end of the thimble 41 to the screw 35, one end of the thimble 41 may be closed except for a central hole of the proper size for receiving a screw 42. The outer end of the adjusting screw 35 has a threaded hole for the screw 42, and the screw 42 is positioned through a knob 44, a lock washer 43, the hole in the end of the thimble 41, and then turned into the end of the adjusting screw 35. The bands of color 36 cover about a ½-inch (1.27-cm) length of the screw 35, and the length of the thimble 41 is proportioned with respect to the length of the screw such that the inner edge of the thimble 41 is moved along the bands of color 36 over the normal range of adjustment of the stop bar 38. By lengthening the sleeve 37 and the thimble 41 substantially as shown in FIGS. 4 and 5, an indexing means for preventing turning of the screw 35 after it is adjusted is provided within the thimble 41. The outer end of the sleeve 37 extends sufficiently beyond the bands of color 36 to accommodate a knurl 45 to be engaged by an end of a spring 46 attached to the inner wall of the thimble 41. The length of the knurl 45 should be long enough to be contacted by the full width of the spring 46 throughout the useable range of adjustment of the screw 35. The spring 46 has one end fastened to the inner surface of the thimble 41, and the outer end extending circumferentially formed in a cross-sectional V-shape so that a vertex extending across the spring 46 is urged against the knurl 45 of the screw 35. The adjusting screws 35 at the opposite brackets 12 and 13 can now be adjusted easily to position the respective stop bars 38 evenly on a transverse line by merely turning the adjusting screws 35 until bands 36 of the same color are even with the inner edges of the respective thimbles 41.

I claim:

1. In a fifth-wheel assembly of the type having a braking control to prevent a trailer from overriding a tractor to which the trailer is connected, a stop assembly adjustable for different loads to determine the amount of traction to release brakes of the trailer;

said fifth-wheel assembly having a mounting bracket to be attached to a tractor, a fifth wheel, a supporting member for supporting said fifth wheel, and a substantially vertical supporting link, said supporting link having a lower portion to be connected to said bracket and an upper portion to be connected to said supporting member, said braking control being connected to said supporting link, bearing means rotatively connecting the lower portion of said supporting link to said mounting bracket, said supporting member being coupled between the upper portion of said supporting link and said fifth wheel, said supporting link being rotatable about said bearing means to allow movement of said upper portion of said supporting link a short distance between a fore position in a direction toward the front of a tractor and an aft position in a direction toward the rear of the tractor, said mounting bracket having means for stopping the rotative motion of said upper position of said supporting link in a direction toward the rear of the tractor at said aft position where the downward component of a load on the fifth wheel is slightly aft of the axis of rotation of said bearing means, said stop assembly comprising a fixed member fastened rigidly with respect to said mounting bracket, said fixed member being positioned a short distance in a direction toward the front of the tractor from said upper portion of said supporting link, stop means positioned between said fixed member and said upper portion of said supporting link, adjusting means between said fixed member and said stop means, and said adjusting means adjustable to set said stop means in a fore-to-aft direction at a position where said upper portion of said supporting link comes in contact with said stop means and stops said supporting link as said supporting link is rotated to said fore position where the downward component of a load on the fifth wheel is a desired short distance from the axis of rotation of said bearing means in a direction toward the front of said tractor.

2. A fifth-wheel assembly as claimed in claim 1 wherein said upper portion of said supporting link is bifurcated to provide an intermediate space for receiving said supporting member and has points on opposite sides of said space for contacting said stop means, said stop means being a bar positioned across said upper portion of said supporting link for contacting said points of said supporting link, and said adjusting means comprises a machine screw to bear against said bar at a position intermediate said points.

* * * * *